(12) United States Patent
Chiba et al.

(10) Patent No.: US 7,407,606 B2
(45) Date of Patent: *Aug. 5, 2008

(54) ELECTROCONDUCTIVE POWDER AND METHOD FOR PRODUCTION THEREOF

(75) Inventors: Katsuichi Chiba, Yokkaichi (JP); Yuichi Yasuda, Yokkaichi (JP)

(73) Assignee: Ishihara Sangyo Kaisha, Ltd., Osaka (JP)

( * ) Notice: Subject to any disclaimer, the term of this patent is extended or adjusted under 35 U.S.C. 154(b) by 59 days.

This patent is subject to a terminal disclaimer.

(21) Appl. No.: 10/565,244

(22) PCT Filed: Jul. 22, 2004

(86) PCT No.: PCT/JP2004/010391

§ 371 (c)(1),
(2), (4) Date: Jan. 19, 2006

(87) PCT Pub. No.: WO2005/008685

PCT Pub. Date: Jan. 27, 2005

(65) Prior Publication Data

US 2006/0208228 A1    Sep. 21, 2006

(30) Foreign Application Priority Data

Jul. 23, 2003  (JP) ............................ 2003-278208

(51) Int. Cl.
*H01B 1/02* (2006.01)
*C01G 23/04* (2006.01)

(52) U.S. Cl. .................... 252/520.1; 106/436; 106/437; 106/438; 427/215; 524/104

(58) Field of Classification Search ................ 252/500, 252/518.1, 520.1, 519.33; 430/111.1; 428/336, 428/378; 106/417, 436, 437, 438; 427/215; 524/104
See application file for complete search history.

(56) References Cited

U.S. PATENT DOCUMENTS

| 3,522,078 A | * | 7/1970 | Walsh et al. ................ 427/215 |
| 3,579,310 A | * | 5/1971 | Lewis et al. ................... 117/75 |
| 4,373,013 A | * | 2/1983 | Yoshizumi .................. 428/570 |
| 4,452,830 A | * | 6/1984 | Yoshizumi .................. 427/215 |
| 4,880,703 A | * | 11/1989 | Sakamoto et al. ........... 428/378 |
| 5,468,584 A | * | 11/1995 | Go et al. ....................... 430/65 |
| 5,534,193 A | * | 7/1996 | Jacobson ................. 252/520.1 |
| 5,698,315 A | * | 12/1997 | Hayashi et al. ............. 428/336 |
| 5,776,373 A | * | 7/1998 | Bergmann et al. ........ 252/518.1 |
| 6,211,144 B1 | * | 4/2001 | Havelund ...................... 514/4 |
| 6,235,443 B1 | * | 5/2001 | Kayamoto et al. ........ 430/111.1 |
| 6,632,276 B1 | * | 10/2003 | Vogt ........................... 106/417 |
| 6,787,231 B1 | * | 9/2004 | Furman et al. ............. 428/402 |
| 2006/0188654 A1 | * | 8/2006 | Onoyama et al. ........... 427/402 |

FOREIGN PATENT DOCUMENTS

| EP | 1 600 484 A1 | 11/2005 |
| EP | 1 647 583 A1 | 4/2006 |
| EP | 1 647 997 A1 | 4/2006 |
| JP | 6-17231 B | 9/1988 |
| JP | 04-154621 | * 5/1992 |
| JP | 4154621 | 5/1992 |
| JP | 06-092636 | * 6/1993 |
| JP | 6-17231 | 1/1994 |
| JP | 3365821 | 4/1994 |
| JP | 6-207118 | 7/1994 |
| JP | 3357107 | 7/1994 |
| JP | 2004-349167 | 12/2004 |
| WO | WO 2005/012449 | 2/2005 |

* cited by examiner

*Primary Examiner*—Mark Kopec
*Assistant Examiner*—Khanh Tuan Nguyen
(74) *Attorney, Agent, or Firm*—Paul E. White; Manelli Denison & Selter PLLC

(57) ABSTRACT

A method for producing a titanium dioxide powder having a well electroconductive layer containing substantially no antimony, which comprises providing a titanium dioxide powder containing specific amounts or less of alkali metals, such as sodium and potassium, alkaline earth metals, such as magnesium and calcium, and metals having a valence of four or less, such as aluminum, zinc and iron, preparing an aqueous suspension of the titanium dioxide powder, adding an acidic aqueous solution containing a tin compound and a phosphorus compound and an alkaline solution to the above aqueous suspension so that the aqueous suspension has a pH in the range of 2 to 6 or 8 to 12, and firing the resulting product at a temperature of 600 to 925° C.

7 Claims, No Drawings

ELECTROCONDUCTIVE POWDER AND METHOD FOR PRODUCTION THEREOF

This application is the national phase of international application PCT/JP2004/010391 filed 22 Jul. 2004 which designated the U.S.

TECHNICAL FIELD

The present invention relates to an electroconductive powder having, on the surface of titanium dioxide, an electroconductive layer containing tin oxide and phosphorus and containing substantially no antimony, and a method for producing the same.

BACKGROUND ART

Titanium dioxide can be widely controlled in its particle diameter from micron-size to nano-size, and its particle shape includes various shapes such as particulate shape, nearly spherical shape and spherical shape, and, in addition, acicular shape, spindle shape and platy shape. For example, titanium dioxide having a particle diameter of about 0.15-0.25 μm is excellent in hiding power and coloring power and chemically stable, and hence is used in a wide variety of the fields as white pigments. Fine particle titanium dioxide of less than about 0.1 μm shows transparency and screens ultraviolet rays when incorporated in a resin, and hence used as a transparent pigments, and acicular titanium dioxide having a length of 1-10 μm and a ratio of length to diameter (axial ratio) of 3 or higher is used as special pigments lowered in coloring power or a loading material.

When an electroconductive layer is formed on the surface of such titanium dioxide, electroconductivity can be given to titanium dioxide which is originally an insulator, and the titanium dioxide is used as electroconductivity imparting agents or antistatic agents for glass, ceramic articles such as toners for electrophotography, plastic articles such as polymer molded products and polymer films, and paper articles such as electrophotographic copying papers and electrostatic recording papers. The reasons for using titanium dioxide as base particles on which an electroconductive layer is formed are that the amount of the electroconductive materials necessary for obtaining the desired electroconductivity can be reduced and, furthermore, titanium dioxide has various particle diameters or particle shapes as mentioned above, and functionality of titanium dioxide can be optionally selected depending on sites of use of the electroconductivity imparting agents. For example, when white pigment titanium dioxide is used as base particles, a white electroconductive powder is obtained, and when fine particle titanium dioxide is used as base particles, a transparent electroconductive powder is obtained, and when acicular titanium dioxide is used as base particles, the electroconductivity can be made efficient by utilizing the anisotropy in shape.

For the electroconductive layer formed on the surface of titanium dioxide, there has been widely used tin oxide doped with antimony because it has excellent electroconductivity and, besides, is less in change of electroconductivity with time (see, for example, Patent Document 1). However, recently the toxicity of antimony is feared, and researches on electroconductive powders containing no antimony have been conducted, resulting in development of tin oxide doped with phosphorus in place of antimony (see, for example, Patent Documents 2 and 3).

Patent Document 1: JP-B-6-17231
Patent Document 2: Patent No.3357107
Patent Document 3: Patent No.3365821

DISCLOSURE OF INVENTION

Problem to be Solved by the Invention

Tin oxide doped with phosphorus is less in problem of toxicity, but a layer having satisfactory electroconductivity can hardly be formed on the surface of titanium dioxide and the electroconductivity greatly changes depending on the conditions for preparation of phosphorus-doped tin oxide and is unstable. Therefore, improvement in this respect is demanded.

Means for Solving the Problem

The inventors have restudied titanium dioxide on which an electroconductive layer of tin oxide doped with phosphorus, and, as a result, it has been found that known titanium dioxides obtained by conventional methods contain compounds of alkali metals such as sodium and potassium, alkaline earth metals such as magnesium and calcium, aluminum, silicon, phosphorus, sulfur, zirconium, niobium, zinc and iron which originate from starting materials for production, additives added during production or materials for surface treatment of the produced titanium dioxide. It has been further found that when an electroconductive layer is formed on the surface of titanium dioxide containing more than a specific amount of the compounds of metallic elements having a valence of 4 or less, for example, alkali metals such as sodium and potassium, alkaline earth metals such as magnesium and calcium, aluminum, zinc and iron, the metallic elements having a valence of 4 or less diffuse into the electroconductive layer by firing and satisfactory electroconductive layer cannot be obtained, and, on the other hand, when titanium dioxide containing the metallic element having a valence of 4 or less in an amount of not more than a specific amount is used, satisfactory electroconductivity can be obtained. Furthermore, it has been found that as a means for forming the electroconductive layer of tin oxide doped with phosphorus, when an acidic aqueous solution containing a tin compound and a phosphorus compound and an alkaline aqueous solution are added to an aqueous suspension of titanium dioxide containing a specific amount or less of a compound of a metallic element having a valence of 4 or less with maintaining pH of the aqueous suspension in a specific range, and then the resulting product is fired at a specific temperature, there is obtained an electroconductive powder containing only a specific amount or less of a compound of a metallic element having a valence of 4 or less, and the resulting powder has a good electroconductivity. As a result, the present invention has been accomplished.

That is, the present invention relates to (a) an electroconductive powder having an electroconductive layer containing tin oxide and phosphorus, but containing substantially no antimony on the surface of titanium dioxide, and the content of a metallic element having a valence of 4 or less which is contained as an impurity in the electroconductive powder is 0.1 or less as (A) obtained by the following formula (1):

$$(A) = (M_1) \times (4-n_1) + (M_2) \times (4-n_2) + (M_3) \times (4-n_3) + (M_4) \times (4-n_4) + \ldots + (M_X) \times (4-n_x).$$  Formula (1):

In the above formula, $M_1, M_2, M_3, M_4, \ldots, M_X$ represent an atomic ratio of each metallic element having a valence of 4 or less to Sn of the tin oxide in the electroconductive powder, $n_1, n_2, n_3, n_4, \ldots, n_X$ represent a valence number of each metallic element having the atomic ratio of $M_1, M_2, M_3, M_4, \ldots, M_X$, X in $M_X$ and $n_X$ represents the number of the metallic element contained in the electroconductive powder and can have a natural number of 1 or more.

A preferred embodiment is that the amount of the tin oxide forming the electroconductive layer is in the range of 0.015-0.3 g as $SnO_2$ per 1 $m^2$ of the surface area of titanium dioxide or the amount of the phosphorus contained in the electroconductive layer with respect to tin oxide is a proportion of 0.10-0.50 in terms of the atomic ratio P/Sn. Furthermore, it is also a preferred embodiment that the content of the metallic element having a valence of 4 or less which is contained in titanium dioxide as an impurity is 0.02 or less as (B) obtained by the following formula (2):

$$(B)=(M'_1)\times(4-n'_1)+(M'_2)\times(4-n'_2)+(M'_3)\times(4-n'_3)+(M'_4)\times(4-n'_4)+\ldots+(M'_Y)\times(4-n'_Y). \quad \text{Formula (2):}$$

In the above formula, $M'_1, M'_2, M'_3, M'_4, \ldots, M'_Y$ represent an atomic ratio of each metallic element having a valence of 4 or less, the atomic ratio being to Ti of titanium dioxide, $n'_1, n'_2, n'_3, n'_4, \ldots, n'_Y$ represent a valence number of each metallic element having the atomic ratio of $M'_1, M'_2, M'_3, M'_4, \ldots, M'_Y$, Y in $M'_Y$ and $n'_Y$ represents the number of the metallic element contained in the titanium dioxide and can have a natural number of 1 or more.

Furthermore, the present invention relates to (b) a method for producing an electroconductive powder which comprises adding an acidic aqueous solution in which a tin compound and a phosphorus compound are dissolved and an aqueous alkaline solution to an aqueous suspension of titanium dioxide in which the content of the metallic element having a valence of 4 or less contained in the titanium dioxide as an impurity is 0.02 or less as (B) obtained by the above formula (2) with maintaining pH of the aqueous suspension in the range of 2-6 or 8-12, then fractionating the resulting product, and firing the product at a temperature of 600-925° C. to form an electroconductive layer containing tin oxide and phosphorus on the surface of the titanium dioxide.

Effects of the Invention

The present invention relates to an electroconductive powder having an electroconductive layer containing tin oxide and phosphorus, but containing substantially no antimony on the surface of titanium dioxide, and the content of a metallic element having a valence of 4 or less which is contained as an impurity in the electroconductive powder is 0.1 or less as (A) obtained by the formula (1), and the electroconductive powder has the desired electroconductivity since it contains less impurities which damage the electroconductivity. Like the conventional electroconductive powders, the electroconductive powder of the present invention is used as an electroconductivity imparting agents or antistatic agents for ceramic articles such as glass, plastic articles such as polymeric molded products and polymeric films, and paper articles such as electrophotographic copying papers and electrostatic recording papers, or electrostatic charging adjustors for electrophotographic toners or resistance adjustors for sensitizing drums. The electroconductive powder is used by incorporating into ceramic articles, plastic articles, paper articles, etc. or coating a paint containing the electroconductive powder on the surface of articles or on the surface of raw materials of the articles.

Furthermore, the present invention relates to a method for producing an electroconductive powder which comprises adding an acidic aqueous solution in which a tin compound and a phosphorus compound are dissolved and an alkaline aqueous solution are added to an aqueous suspension of titanium dioxide in which the content of a metallic element having a valence of 4 or less contained in the titanium dioxide as an impurity is 0.02 or less as (B) obtained by the above formula (2) with maintaining pH of the aqueous suspension in the range of 2-6 or 8-12, and then the resulting product is fractionated and fired at a temperature of 600-925° C. to form an electroconductive layer containing tin oxide and phosphorus on the surface of the titanium dioxide. According to this method, the electroconductive layer containing tin oxide and phosphorus which is coated on the surface can be formed as a continuous film and, besides, content of the impurities which damage the electroconductivity can be reduced, and thus powders having the desired electroconductivity can be easily produced.

BEST MODE FOR CARRYING OUT THE INVENTION

It is important that the electroconductive powder of the present invention has an electroconductive layer containing tin oxide and phosphorus on the surface of titanium dioxide, and substantially no antimony is contained in this electroconductive layer, and the amount of the metallic element having a valence of 4 or less as an impurity in the electroconductive powder is not more than a specific amount, and a columnar powder body made by compacting the electroconductive powder under a pressure of 9.8 MPa can have a powder resistivity of preferably $1\times10^5$ $\Omega\cdot$cm or less, more preferably $1\times10^4$ $\Omega\cdot$cm or less, most preferably $1\times10^3$ $\Omega\cdot$cm or less.

The content of the impurity contained in the electroconductive powder of the present invention is shown in terms of (A) obtained by the following formula (1).

$$(A)=(M_1)\times(4-n_1)+(M_2)\times(4-n_2)+(M_3)\times(4-n_3)+(M_4)\times(4-n_4)+\ldots+(M_X)\times(4-n_X). \quad \text{Formula (1):}$$

In the above formula (1), $M_1, M_2, M_3, M_4, \ldots, M_X$ show an atomic ratio of each metallic element having a valence of 4 or less, such as sodium, potassium, calcium, magnesium, zinc, aluminum, iron, or the like, said atomic ratio being to Sn of the tin oxide in the electroconductive powder. The $M_1, M_2, M_3, M_4, \ldots, M_X$ depend on the number of the metallic element having a valence of 4 or less which is an impurity contained in the electroconductive powder, and X of $M_X$ can be a natural number of 1 or more. When the metallic element having a valence of 4 or less is not contained in the electroconductive powder, $M_X$ is 0. However, the metallic element having a valence of 4 or less does not include the organometallic compound such as a coupling agent mentioned hereinafter which is not doped in tin oxide and with which the surface of the electroconductive powder is treated after firing. In the present invention, the metallic elements include typical metallic elements such as sodium, potassium, calcium, magnesium, zinc and aluminum, transition metallic elements such as iron, and additionally semimetals such as boron, silicon, germanium, arsenic, antimony, selenium and tellurium. Elements other than these metallic elements are called nonmetals. In the present invention, the atomic ratio means a ratio of the number of the objective metal atom to the number of the standard metal atom.

The $n_1, n_2, n_3, n_4, \ldots, n_X$ in the formula (1) represent a valence number (valence) of each metallic element having the atomic ratio of $M_1, M_2, M_3, M_4, \ldots, M_X$, and can be a numeral of more than 0 and not more than 4. X in $n_X$ is the same numerical value as X in $M_X$ and can be a natural number of 1 or more. Sodium, potassium, etc. have a valence of 1, calcium, magnesium, zinc, etc. have a valence of 2, and aluminum, etc. have a valence of 3. Iron has a valence of 2 or 3, silicon and zirconium have a valence of 2 or 4, and niobium has a valence of 2-5, and thus there are metallic elements which can have a plurality of valences. In these cases, the state of valence of the metallic elements contained in the electroconductive powder is determined by XPS (X-ray photo-electron spectroscopy), ESR (electron-spin resonance), etc., and those which have a valence of more than 0 and less than 4 are considered to be impurities damaging the electroconductivity, those which have a valence of 4 are considered to be impurities which do not influence the electroconductivity, and those which have a valence of more than 4 are not considered to be impurities. Particularly, metallic elements having a valence of more than 0 and 3 or less are impurities which greatly damage the electroconductivity.

In the formula (1), as for the metallic elements having a valence of 4 or less contained in the electroconductive powder, the influence of each impurity can be calculated by subtracting the valence number n of each metallic element from the valence number 4 of tin in tin oxide and multiplying the content of each metallic element (atomic ratio to Sn) by the valence number obtained by the subtraction, and the total (A) of them is taken as total content of the impurities. Therefore, the total content (A) of impurities is represented by $\Sigma(M_X) \times (4-n_X)$. In the present invention, it is important that the impurity total content (A) is 0.1 or less, and it is preferably 0.07 or less, more preferably 0.06 or less, further preferably 0.02 or less and most preferably 0.001 or less. When the impurity total content of the metallic elements having a valence of 4 or less is at least in the above range, the desired electroconductivity can be obtained, but if it is more than the above range, the desired electroconductivity can hardly be obtained. In the present invention, quantitative analysis of the metallic element is carried out by X-ray fluorescence analysis, and the valence of the metallic element is determined by XPS (X-ray photo-electron spectroscopy), ESR (electron-spin resonance), etc.

The electroconductive layer formed on the surface of titanium dioxide has a structure in which a part of tetravalent tin ions constituting tin oxide are replaced by pentavalent phosphorus ions and phosphorus is dissolved in the form of solid solution (doped) in tin oxide, and substantially no antimony is contained in the electroconductive layer. The term "substantially no antimony is contained" means that the content of antimony is less than limit of detection when determined by X-ray fluorescence analysis using an ordinary X-ray fluorescence analytical instrument such as RIX3000 manufactured by Rigaku Denki Kogyo Co., Ltd. The amount of tin oxide in the electroconductive layer can be optionally set, and is preferably in the range of 0.015-0.3 g, more preferably in the range of 0.03-0.3 g as $SnO_2$ per 1 $m^2$ of the surface area of titanium dioxide, and within the above range, at least good electroconductivity is obtained. On the other hand, if the amount is less than the above range, a continuous electroconductive layer can hardly be formed and the desired electroconductivity can hardly be obtained, and if it is too large, tin oxide is apt to precipitate in places other than the titanium dioxide surfaces, which is uneconomical, and, besides, reduction in whiteness of the electroconductive powder is apt to occur. The amount of tin oxide is further preferably in the range of 0.05-0.2 g. The amount of phosphorus in the electroconductive layer can be optionally set, and the amount of phosphorus with respect to tin oxide is preferably a proportion of 0.10-0.50 in terms of the atomic ratio P/Sn, and within this range, good electroconductivity can be obtained. On the other hand, if the amount is less than the range, the desired electroconductivity can hardly be obtained, and if it is too large, the electroconductivity is apt to decrease. The amount of phosphorus is more preferably a proportion of 0.13-0.40 and further preferably a proportion of 0.15-0.30. The electroconductive layer containing tin oxide and phosphorus is preferably lower in content of the metallic element having a valence of 4 or less, such as sodium, potassium, calcium, magnesium, zinc, aluminum and iron, and formation of a continuous electroconductive layer can be confirmed by a transmission type electron microscope photograph. Furthermore, as an indication for the state of formation of the electroconductive layer, there can be used specific surface area of the electroconductive layer obtained from the following formula (3). It can be said that if the specific surface area is larger than 70 $m^2/g$, tin oxide is present in the form of fine particulate mass in addition to a continuous layer, and if it is 70 $m_2/g$ or smaller, at least, tin oxide is not present in the form of fine particulate mass other than a continuous layer. The content of the electroconductive layer forming component in the formula (3) is a total amount of tin oxide (amount as $SnO_2$) and phosphorus (amount as $P_2O_5$).

Formula (3): Specific surface area of electroconductive layer ($m^2/g$)=(specific surface area of electroconductive powder)/(content of electroconductive layer forming component in 1 g of the electroconductive powder)

In the present invention, the specific surface area of titanium dioxide and the electroconductive powder can be obtained by BET method.

In the electroconductive powder of the present invention, the titanium dioxide on which the electroconductive layer containing tin oxide and phosphorus is formed is preferably lower in content of the metallic elements having a valence of 4 or less, such as sodium, potassium, calcium, magnesium, zinc, aluminum and iron, and more preferably the content of the metallic elements having a valence of 4 or less which are contained in titanium dioxide as impurities is 0.02 or less as (B) obtained by the following formula (2):

$$(B)=(M'_1) \times (4-n'_1)+(M'_2) \times (4-n'_2)+(M'_3) \times (4-n'_3)+(M'_4) \times (4-n'_4)+ \ldots +(M'_Y) \times (4-n'_Y).$$ Formula (2):

In the above formula (2), $M'_1, M'_2, M'_3, M'_4, \ldots, M'_Y$ show an atomic ratio of each metallic element having a valence of 4 or less, such as sodium, potassium, calcium, magnesium, zinc, aluminum or iron, and the atomic ratio is to Ti of titanium dioxide. The $M'_1, M'_2, M'_3, M'_4, \ldots, M'_y$ depend on the number of the metallic elements having a valence of 4 or less which are impurities contained in titanium dioxide, and Y of $M'_Y$ can be a natural number of 1 or more. When the metallic elements having a valence of 4 or less are not contained in titanium dioxide, $M'_Y$ is 0. The $n'_1, n'_2, n'_3, n'_4, \ldots, n'_y$ show a valence number (valence) of each metallic element having the atomic ratio of $M'_1, M'_2, M'_3, M'_4, \ldots, M'_y$, and can be a numerical value of more than 0 and not more than 4. Y in $n'_Y$ is the same numerical value as Y in $M'_Y$ and can be a natural number of 1 or more. Sodium, potassium, etc. have a valence of 1, calcium, magnesium, zinc, etc. have a valence of 2, and aluminum, etc. have a valence of 3. Iron has a valence of 2 or 3, silicon and zirconium have a valence of 2 or 4, and niobium has a valence of 2-5, and thus there are metallic elements which can have a plurality of valences. In these cases, the state of valence of the metallic elements contained in titanium dioxide is determined by XPS (X-ray photo-electron spectroscopy), ESR (electron-spin resonance), etc., and those which have a valence of more than 0 and less than 4 are considered to be impurities damaging the electroconductivity, those which have a valence of 4 are considered to be impurities which do not influence the electroconductivity, and those which have a valence of more than 4 are not considered to be impurities. Particularly, those metallic elements having a valence of more than 0 and 3 or less are impurities which have a great influence on damaging of the electroconductivity.

In the formula (2), as for the metallic elements having a valence of 4 or less contained in titanium dioxide, the power of influence of the respective impurities can be calculated by subtracting the valence number n of the metallic element from the valence number 4 of tin in tin oxide coated on the surface of titanium dioxide and multiplying the content of the metallic element (atomic ratio to Ti) by the valence number obtained by the subtraction, and the total (B) of them is regarded as the total content of the impurities in titanium dioxide. Therefore, the total content (B) of the impurities in titanium dioxide is represented by $\Sigma(M'_\gamma) \times (4-n'_\gamma)$. In the present invention, the impurity total content (B) is preferably 0.02 or less, more preferably 0.015 or less, further preferably 0.006 or less. When the impurity total content of the metallic elements having a valence of 4 or less is at least in the above range, the desired electroconductivity can be obtained, but if it is more than the above range, the desired electroconductivity can hardly be obtained. Furthermore, it is preferred that titanium dioxide does not contain compounds of metallic elements having a valence of more than 4 as far as possible because metallic elements having a valence of more than 4 reduce the mobility of transmitting electrons generated by doping of tin oxide with phosphorus. These metallic elements include, for example, niobium. Furthermore, it is preferred that compounds of nonmetal elements (excluding oxygen) such as phosphorus and sulfur are not contained as far as possible. More specifically, suitable titanium dioxide is of such a high quality that the total content (in terms of anhydrous oxide with respect to $TiO_2$) of all impurities including nonmetal elements such as phosphorus and sulfur (excluding oxygen) in addition to the metallic elements having a valence of 4 or less and metallic elements having a valence of more than 4 is not more than 1.5% by weight, preferably not more than 1.0% by weight, more preferably not more than 0.5% by weight, further preferably not more than 0.1% by weight, namely, the $TiO_2$ purity is not less than 98.5% by weight, preferably not less than 99.0% by weight, more preferably not less than 99.5% by weight, further preferably not less than 99.9% by weight.

The particle shape and particle diameter of titanium dioxide used in the present invention can be optionally selected depending on sites of use of the electroconductive powder. The particle shapes include, for example, particulate shape, nearly spherical shape, spherical shape, acicular shape, fibrous shape, columnar shape, rod shape, spindle shape, platy shape, and other similar shapes. Those of acicular shape, etc. which have an axial ratio are preferred because of easy improvement in efficiency of electroconductivity. The particle diameter is preferably 0.01-3 µm, more preferably 0.03-0.3 µm in average particle diameter for those of particulate shape, nearly spherical shape and spherical shape. On the other hand, in the case of having an axial ratio, such as acicular shape, fibrous shape, columnar shape, rod shape and spindle shape, spindle-shaped fine particle titanium dioxide having a length of 0.05-0.3 µm and a ratio of length and maximum diameter (axial ratio) of 3 or more, preferably 10 or more and acicular or rod-shaped titanium dioxide having a length of 1-10 µm and a ratio of length and diameter (axial ratio) of 3 or more, preferably 10 or more are further preferred. The particle shape and particle diameter of titanium dioxide are observed and measured by electron microscope photographs.

The specific surface area of titanium dioxide varies depending on the shape or size of particles, and 0.5-160 $m^2/g$ is preferred and 4-60 $m^2/g$ is more preferred for those of particulate shape, nearly spherical shape and spherical shape, 0.3-20 $m^2/g$ is preferred and 1-15 $m^2/g$ is more preferred for those of acicular shape, fibrous shape, columnar shape and rod shape, and 10-250 $m^2/g$ is preferred and 30-200 $m^2/g$ is more preferred for those of spindle shape. As for crystal systems of titanium dioxide used in the present invention, there may be used any crystal systems of rutile, anatase, brookite and amorphous systems, but rutile type titanium dioxide of the same system as tin oxide which is a main component of the electroconductive layer is preferred since electroconductivity can be readily developed.

An organic material may sometimes be applied to the surface of the electroconductive powder to improve dispersibility into resin or stability of electroconductivity with time. As the organic material, mention may be made of, for example, organometallic compounds such as of silicon, titanium, aluminum, zirconium, zirconium aluminum, and the like, and polyols. These organic materials may be used each alone or in combination of two or more. The content of the organic materials is about 0.0001-0.4 g and more suitably about 0.0006-0.2 g per 1 $m^2$ of the surface area of the electroconductive powder.

Specifically, the silicon-based organometallic compounds include silane coupling agents such as aminopropyltriethoxysilane, N-β(aminoethyl)-γ-aminopropyltriethoxysilane, N-phenyl-γ-aminopropyltrimethoxysilane, vinyltrimethoxysilane, vinyltriethoxysilane, vinyltrichlorosilane, γ-glycidoxypropyltrimethoxysilane and methacryloxypropyltrimethoxysilane, alkylsilanes such as n-butyltriethoxysilane, isobutyltrimethoxysilane, n-hexyltrimethoxysilane, n-hexyltriethoxysilane, n-octyltrimethoxysilane, n-octyltriethoxysilane, n-decyltrimethoxysilane, n-octadecyltrimethoxysilane and n-octadecylmethyldimethoxysilane, phenylsilanes such as phenyltriethoxysilane, fluorosilanes such as trifluoropropyltrimethoxysilane, and polysiloxanes such as methylhydrogenpolysiloxane, dimethylpolysiloxane, methylphenylpolysiloxane, dimethylpolysiloxanediol, alkyl-modified silicone oil, alkylaralkyl-modified silicone oil, amino-modified silicone oil, both-end amino-modified silicone oil, epoxy-modified silicone oil, both-end epoxy-modified silicone oil and fluorine-modified silicone oil. The titanium-based organometallic compounds include, for example, titanate coupling agents such as isopropyltriisostearoyl titanate, isopropyltris(dioctylpyrophosphate) titanate, tetra(2,2-diallyloxymethyl-1-butyl)bis(ditridecyl)phosphite titanate, bis(dioctylpyrophosphate)oxyacetate titanate and bis(dioctylpyrophosphate)ethylene titanate. The aluminum-based organometallic compounds include, for example, aluminate coupling agents such as acetalkoxyaluminumdiisopropylate. The zirconium-based organometallic compounds include, for example, zirconiumtributoxyacetylacetonate and zirconiumtributoxy stearate.

The polyols include, for example, trimethylolethane, trimethylolpropane and pentaerythritol.

In the method of producing the electroconductive powder of the present invention, it is important to use titanium dioxide in which the content of the metallic elements having a valence of 4 or less contained as impurities in titanium dioxide is 0.02 or less, preferably 0.015 or less, more preferably 0.006 or less as (B) obtained by the above formula (2). Furthermore, as a preferred embodiment, there may be suitably used titanium dioxide of such a high quality that the total content (with respect to $TiO_2$ and in terms of anhydrous oxide) of all impurities including nonmetal elements (excluding oxygen) such as phosphorus and sulfur in addition to the metallic elements having a valence of 4 or less and metallic elements having a valence of more than 4 is not more than 1.5% by weight, preferably not more than 1.0% by weight, more preferably not more than 0.5% by weight, further preferably not more than 0.1% by weight, namely, the $TiO_2$ purity is not less than 98.5% by weight, preferably not less than 99.0% by weight, more preferably not less than 99.5% by weight, further preferably not less than 99.9% by weight. Such titanium dioxide can be produced by conventional methods for production of titanium dioxide, such as chloride method, sulfate method, flame hydrolysis method, wet hydrolysis method, neutralization method and sol-gel method which can produce titanium dioxide containing metallic elements having a valence of 4 or less, such as sodium, potassium, calcium, magnesium, zinc, aluminum and iron or total impurities in only a specific amount or less or the titanium dioxide can be produced by selecting production conditions. Furthermore, after producing titanium dioxide containing impurities in an amount more than a specific amount, the titanium oxide containing the impurities is treated with an acid or alkali, or treated with alkali after the acid treatment or treated with acid after the alkali treatment, whereby the metallic elements having a valence of 4 or less or total impurities can be removed to reduce the amount to the above range. As the acid used, inorganic acids such as hydrochloric acid, sulfuric acid, nitric acid and hydrofluoric acid are suitable, and, ordinarily, a 1-50 wt % aqueous solutions of the acid is used. As for the alkali, a 10-50 wt % aqueous solution of sodium hydroxide, potassium hydroxide or the like is used. The acid treatment or alkali treatment may be carried out by introducing titanium dioxide in the above acid solution or alkali solution, followed by stirring for 1-3 hours, and if necessary, the stirring may be carried out while heating to 50-90° C. By the single treatment with acid or alkali, titanium dioxide of the desired quality can be obtained, but titanium dioxide of the higher quality can easily be obtained by combination of the acid treatment and the alkali treatment.

An aqueous suspension of the above titanium dioxide is prepared, and a tin compound and a phosphorus compound are added thereto to coat the tin compound and the phosphorus compound on the surface of the titanium dioxide. There are various coating methods, and in the present invention it is important to separately prepare an acidic aqueous solution in which the tin compound and the phosphorus compound are dissolved and an alkaline aqueous solution, respectively, and add them with maintaining pH of the titanium dioxide aqueous suspension in the range of 2-6 or 8-12. When the pH of the aqueous suspension is in the above range, at least the tin compound and the phosphorus compound are uniformly coated on the surface of titanium dioxide and satisfactory electroconductivity can be obtained, but if the pH is lower or higher than the above range, the tin compound and the phosphorus compound can hardly be coated on the surface of titanium dioxide and the desired electroconductivity can hardly be obtained, resulting in increase of the content of the compounds of the metallic elements having a valence of 4 or less as impurities. When the pH of the titanium dioxide aqueous suspension is in the range of 8-12, the tin compound and the phosphorus compound are more uniformly coated, which is preferred, and a range of 9-10 is more preferred. A pH range of 2-3 is preferred on the acidic side. The concentration of titanium dioxide in the aqueous suspension can be optionally set, and 25-300 g/l is suitable and 50-200 g/l is preferred. The temperature of the aqueous suspension is preferably in the range of room temperature (10-30° C.) to 95° C. and more preferably in the range of 60-80, 90° C. The temperature of the acidic aqueous solution in which the tin compound and the phosphorus compound are dissolved and the alkaline aqueous solution is not particularly limited and may be similar to the temperature of the aqueous suspension.

There may be used various tin compounds, and examples thereof are stannic chloride, stannous chloride, potassium stannate, sodium stannate, stannous fluoride, stannous oxalate, and the like. The phosphorus compounds include, for example, phosphorus trichloride, orthophosphoric acid, sodium hydrogenphosphate, trisodium phosphate, ammonium hydrogenphosphate, phosphorous acid, sodium dihydrogenphosphite, trisodium phosphite, phosphorus pentachloride, and the like. One or two or more of these compounds can be used. Such tin compound and phosphorus compound are dissolved in inorganic acids such as hydrochloric acid, sulfuric acid, nitric acid and hydrofluoric acid or organic acids such as formic acid, acetic acid, oxalic acid and citric acid to prepare acidic aqueous solutions. The amount of the tin compound with respect to titanium dioxide may be such as being able to coat a necessary amount of tin oxide, and is an amount which corresponds to preferably 0.015-0.3 g, more preferably 0.03-0.3 g, further preferably 0.05-0.2 g as $SnO_2$ per 1 $m^2$ of the surface area of titanium dioxide and which is an amount necessary for coating. The amount of phosphorus compound may be such as being able to be doped in tin oxide, and is preferably a proportion of 0.10-0.50, more preferably 0.13-0.40, further preferably 0.15-0.30 in terms of the atomic ratio P/Sn, and is an amount necessary for doping. The concentrations of the tin compound and the phosphorus compound in the acidic aqueous solution can be optionally set.

On the other hand, as the alkaline aqueous solution used as a neutralizing agent, there may be used an aqueous solution of at least one of hydroxides or carbonates of alkali metals, such as sodium hydroxide, potassium hydroxide, sodium carbonate and potassium carbonate, and basic compounds such as ammonia, ammonium hydroxide, ammonium carbonate, ammonium hydrogencarbonate, hydrazine and hydroxylamine.

Next, the product obtained by coating the tin compound and the phosphorus compound on the surface of titanium dioxide is fractionated and fired at a temperature of 600-925° C. The fractionation is usually carried out by filtration and, if necessary, washing. When hydroxide or carbonate of alkali metal is used as the neutralizing agent, if the alkali metal adsorbs to the product due to insufficient washing and remains on the product, it may cause decrease of electrocinductivity, and hence it is preferred to sufficiently wash the product to avoid retention of the alkali metal. The degree of washing of the product can be controlled by specific electroconductivity of the filtrate, and the smaller specific electroconductivity (unit: µS/cm) indicates that the washing is carried out more sufficiently. As the degree of washing, it is preferred to carry out the washing until the specific electroconductivity of the filtrate reaches 125 µS/cm or less, more preferably 50 µS/cm or less.

The resulting product obtained by fractionation is then dried, if necessary, and thereafter fired at a temperature of 600-925° C., preferably 750-925° C., more preferably 800-900° C., further preferably 825-875° C. The firing can be carried out in any atmospheres of oxidizing atmosphere, reducing atmosphere and inert gas atmosphere, and it is economically advantageous to carry out the firing in the air, but it is preferred to carry out the firing in an atmosphere of low oxygen concentration formed by diluting the air with an inert gas such as nitrogen, helium or argon, in an inert gas atmosphere of nitrogen, helium or argon, or in a reducing atmosphere such as hydrogen, ammonia or carbon monoxide because good electroconductivity can be obtained. The oxygen concentration of the low oxygen concentration atmosphere is preferably 5-15 vol %, more preferably 7-10 vol % considering economical point and electorconductivity. The firing time varies depending on type of apparatus and treating amount and cannot be unconditionally specified, but is suitably 1-8 hours, preferably 1-6, 3-6 hours. After the firing, the fired product is cooled to a temperature at which it can be taken out. For cooling, there may be selected a rapid cooling method of rapidly cooling the fired product immediately after firing or a slow cooling method of slowly cooling the fired product to about room temperature over a period of 2 or more hours. When the rapid cooling method and the slow cooling method are compared, in the case of cooling the fired product as it is after being fired in a low oxygen concentration atmosphere, an inert gas atmosphere or a reducing atmosphere, there is no large difference in electroconductivity between the rapid cooling method and the slow cooling method, and the electroconductivity is stable, but in the case of cooling the fired product as it is after being fired in the air, good electroconductivity can be obtained more easily in the rapid cooling method than in the slow cooling method. From this viewpoint, the rapid cooling method is preferred since good electroconductivity can be obtained even if the firing is carried out in any atmospheres. The firing temperature is a high temperature of preferably 750° C. or higher, especially 800° C. or higher. When the firing is carried out at high temperatures as above, the firing can be performed with causing substantially no coarsening of particles of the fired product or no sintering of particles, and a sufficient electroconductivity can be easily imparted by optionally selecting the atmosphere of firing or the cooling method.

After cooling, the fired product is taken out of the firing apparatus, and thereafter it can be pulverized by conventional method for making it powders. After pulverization, if necessary, pH of the pulverized product can be adjusted or impurities can be removed. Further, if necessary, the surface of the pulverized product can be treated with an organic material by wet method, dry method, or the like.

Like the conventional electroconductive powders, the electroconductive powders of the present invention are used as electroconductivity imparting agents or antistatic agents for ceramic articles such as glass, plastic articles such as polymeric molded products and polymeric films, and paper articles such as electrophotographic copying papers and electrostatic recording papers, or electrostatic charging adjustors for electrophotographic toners or resistance adjustors for sensitizing drums. They are used by incorporating into ceramic articles, plastic articles, paper articles, etc. or coating a paint containing the electroconductive powders on the surface of articles or on the surface of raw materials of the articles. As resins for raw materials of the above plastic articles, they are selected depending on the purpose and use and are not particularly limited, and various known resins can be used. As examples of the resins, mention may be made of general-purpose engineering plastics such as polyamide, polyacetal, polycarbonate, polyethylene terephthalate, polybutylene terephthalate, modified polyphenylene oxide and modified polyphenylene ether, special engineering plastics such as polyether sulfone, polysulfone, polyether ether ketone, polyether ketone, polyphenylene sulfide, polyarylate, polyamide-bismaleimide, polyetherimide, polyimide and fluoroplastics, and thermoplastic general-purpose resins such as polyethylene, polypropylene, polystyrene, AS resin and ABS resin, and thermosetting resins such as epoxy resin, unsaturated polyester resin, phenolic resin, melamine resin and silicone resin.

Furthermore, as resins for preparing paints containing the electroconductive powder of the present invention, there may be used various resins. The amount of the electroconductive powder of the present invention added to the plastic articles or electroconductive paints can be optionally set depending on the purpose.

EXAMPLE

The present invention will be explained in more detail by the following examples and comparative examples.

Example 1

A high quality rutile type titanium dioxide powder having an average particle diameter of 0.25 µm was used. This titanium dioxide was prepared by chloride method and contained silicon (tetravalent) as the metallic element having a valence of 4 or less as an impurity in an amount of 0.00027 in terms of atomic ratio to Ti of titanium dioxide, while (B) obtained by the formula (2) was 0. Sulfur (hexavalent, nonmetal element) was contained as an impurity in an amount of 0.02% by weight as $SO_3$ as elements (excluding oxygen) other than the metallic elements having a valence of 4 or less, and the $TiO_2$ purity of the titanium dioxide was 99.96% by weight. The specific surface area obtained by BET method was 6.6 $m^2/g$.

100 g of this high quality titanium dioxide powder was introduced into water to prepare a suspension of 100 g/l in concentration. An aqueous hydrochloric acid solution was added to the suspension to adjust the pH to 2-3, followed by heating to 70° C. An aqueous sodium hydroxide solution and a mixed solution comprising 173 g of a 50 wt % aqueous stannic chloride ($SnCl_4$) solution, 6.1 g of 85 wt % phosphoric acid ($H_3PO_4$) and 75 ml of 12N-hydrochloric acid solution were added in parallel to the suspension over a period of 60 minutes with maintaining the pH of the suspension at 2-3 to form a coating layer comprising a hydrate of tin oxide containing phosphoric acid on the titanium dioxide powder. The final pH of the suspension was 2. The suspension was stirred for 20 minutes for aging while keeping 70° C.

Then, the coated titanium dioxide powder was filtered, washed until the specific electroconductivity of the filtrate reached 50 µS/cm, and dried overnight at 120° C., and the coated titanium dioxide powder was recovered. The recovered coated titanium dioxide powder was fired in the air at 850° C. for 1 hour by an electric furnace and then pulverized by a pulverizer to obtain a white electroconductive powder (Sample A) of the present invention.

The amount of tin oxide contained in the Sample A was 0.076 g as $SnO_2$ per 1 $m^2$ of the surface area of titanium dioxide, and the amount of phosphorus with respect to tin oxide was a proportion of 0.17 in terms of the atomic ratio P/Sn. The metallic elements having a valence of 4 or less contained as impurities in the Sample A were less than limit of detection, and (A) obtained by the formula (1) was 0. Furthermore, the specific surface area of the Sample A was 30.2 $m^2/g$ and the specific surface area of the electroconductive layer was 86.4 $m^2/g$.

Example 2

A white electroconductive powder (Sample B) of the present invention was obtained in the same manner as in Example 1, except that a rutile type titanium dioxide powder having an average particle diameter of 0.25 µm and containing a small amount of alumina was used in place of the high quality rutile type titanium dioxide powder used in Example 1.

The titanium dioxide used was prepared by chloride method. The content of aluminum (trivalent) was 0.005 in atomic ratio to Ti of titanium dioxide, other metallic elements having a valence of 4 or less were not detected, and (B) obtained by the formula (2) was 0.005. No other elements (excluding oxygen) than the metallic elements having a valence of 4 or less were detected, the $TiO_2$ purity was 99.7% by weight, and the specific surface area obtained by BET method was 6.8 $m^2/g$.

The content of tin oxide contained in the Sample B was 0.074 g as $SnO_2$ per 1 $m^2$ of the surface area of titanium dioxide, and the content of phosphorus with respect to tin oxide was a proportion of 0.17 in terms of the atomic ratio P/Sn. The atomic ratio of aluminum (trivalent) contained in the Sample B to Sn was 0.019, and (A) shown by the formula (1) was 0.019.

Example 3

A white electroconductive powder (Sample C) of the present invention was obtained in the same manner as in Example 1, except that a rutile type titanium dioxide powder having an average particle diameter of 0.25 μm and containing a small amount of alumina was used in place of the high quality rutile type titanium dioxide powder used in Example 1.

The titanium dioxide used was prepared by chloride method. The content of aluminum (trivalent) was 0.015 in atomic ratio to Ti of titanium dioxide, other metallic elements having a valence of 4 or less were not detected, and (B) obtained by the formula (2) was 0.015. As other elements (excluding oxygen) than the metallic elements having a valence of 4 or less, phosphorus (pentavalent, nonmetal element) was contained in an amount of 0.1% by weight as $P_2O_5$, the $TiO_2$ purity was 99.0% by weight, and the specific surface area obtained by BET method was 7.1 $m^2/g$.

The content of tin oxide contained in the Sample C was 0.070 g as $SnO_2$ per 1 $m^2$ of the surface area of titanium dioxide, and the content of phosphorus with respect to tin oxide was a proportion of 0.17 in terms of the atomic ratio P/Sn. The atomic ratio of aluminum (trivalent) contained in the Sample C to Sn was 0.057, no other metallic elements having a valence of 4 or less were detected, and (A) obtained by the formula (1) was 0.057.

Example 4

A white electroconductive powder (Sample D) of the present invention was obtained in the same manner as in Example 1, except that the following high quality acicular titanium oxide powder was used in place of the high quality rutile type titanium dioxide powder, and the 50 wt % aqueous stannic chloride ($SnCl_4$) solution was used in an amount of 307 g in place of 173 g and the 85 wt % phosphoric acid ($H_3PO_4$) was used in an amount of 10.8 g in place of 6.1 g.

The content of tin oxide contained in the Sample D was 0.077 g as $SnO_2$ per 1 $m^2$ of the surface area of titanium dioxide, and the content of phosphorus with respect to tin oxide was a proportion of 0.17 in terms of the atomic ratio P/Sn. Metallic elements having a valence of 4 or less contained in the sample D were not detected, and (A) shown by the formula (1) was 0.

The acicular titanium oxide powder used in Example 4 was prepared in accordance with the method described in JP-B-47-44974. That is, fine particle hydrous titanium dioxide in an amount of 4 parts by weight as $TiO_2$, sodium chloride in an amount of 4 parts by weight and sodium hydrogenphosphate ($Na_2HPO_4.2H_2O$) in an amount of 1 part by weight were uniformly mixed and put in a crucible, followed by firing at 825° C. for 3 hours by an electric furnace. Thereafter, the fired product was introduced into water and boiled for 1 hour, followed by filtration and washing to remove soluble salts. The resulting acicular titanium oxide had a length of 3-5 μm and a diameter of 0.05-0.07 μm, and was analyzed to find that it contained 3.8% by weight of a sodium component as $Na_2O$ and 4.4% by weight of a phosphorus component as $P_2O_5$ as impurities, and had a $TiO_2$ purity of 91.0% by weight. The fine particle hydrous titanium dioxide was a rutile type fine titania obtained by neutralizing an aqueous titanium tetrachloride solution having a concentration of 200 g/l as $TiO_2$ with an aqueous sodium hydroxide solution while keeping 30° C. to precipitate colloidal amorphous titanium hydroxide, aging the colloidal titanium hydroxide at 70° C. for 5 hours, and then drying it at 120° C.

Then, the above acicular titanium oxide was introduced into water to prepare an aqueous suspension, and thereto was added an aqueous sodium hydroxide solution (200 g/l) to adjust the pH to 13.0. Thereafter, the suspension was heated to 90° C. and stirred for 2 hours to carry out an alkali treatment, and then an aqueous hydrochloric acid solution (100 g/l) was added to adjust the pH to 7.0, followed by filtration and washing until the specific electroconductivity of the filtrate reached 50 μS/cm. Successively, the following acid treatment was carried out.

The resulting filtration cake was again introduced into water to prepare an aqueous suspension, and thereto was added an aqueous hydrochloric acid solution (100 g/l) to adjust the pH to 1.0. Thereafter, the suspension was heated to 90° C. and stirred for 2 hours, followed by filtration and washing until the specific electroconductivity of the filtrate reached 50 μS/cm.

The components of the acicular titanium oxide treated as above were analyzed to find that the metallic elements having a valence of 4 or less were less than the limit of detection and (B) obtained by the formula (2) was 0. As other elements (excluding oxygen) than the metallic elements having a valence of 4 or less, phosphorus (pentavalent, nonmetal element) was contained in an amount of 0.1% by weight as $P_2O_5$, the $TiO_2$ purity was 99.9% by weight, and the specific surface area of the acicular titanium oxide obtained by BET method was 11.5 $m^2/g$.

Comparative Example 1

Sample E was obtained in the same manner as in Example 1, except that a rutile type titanium dioxide powder for pigments which had an average particle diameter of 0.25 μm was used in place of the high quality rutile type titanium dioxide powder used in Example 1.

The titanium dioxide used contained aluminum (trivalent) in an amount of 0.034 and silicon (tetravalent) in an amount of 0.0027 in atomic ratio to Ti of titanium dioxide, and other metallic elements having a valence of 4 or less were not detected, and (B) obtained by the formula (2) was 0.034. As other elements (excluding oxygen) than the metallic elements having a valence of 4 or less, phosphorus (pentavalent, nonmetal element) was contained in an amount of 0.1% by weight as $P_2O_5$, the $TiO_2$ purity was 97.6% by weight, and the specific surface area obtained by BET method was 12.4 $m^2/g$.

The content of tin oxide contained in the Sample E was 0.040 g as $SnO_2$ per 1 $m^2$ of the surface area of titanium dioxide, and the content of phosphorus with respect to tin oxide was a proportion of 0.17 in terms of the atomic ratio P/Sn. The atomic ratios of aluminum (trivalent) and silicon (tetravalent) contained in the Sample E to Sn were 0.12 and 0.0080, respectively, and other metallic elements having a valence of 4 or less were not detected, and (A) shown by the formula (1) was 0.12.

Comparative Example 2

Sample F was obtained in the same manner as in Example 1, except that a rutile type titanium dioxide powder containing zinc oxide was used in place of the high quality rutile type titanium dioxide powder used in Example 1.

The titanium dioxide used was prepared by sulfate method. The titanium dioxide contained zinc (divalent) in an amount of 0.007, sodium (monovalent) in an amount of 0.003, aluminum (trivalent) in an amount of 0.003 and silicon (tetravalent) in an amount of 0.0027 in atomic ratio to Ti of titanium dioxide, other metallic elements having a valence of 4 or less were not detected, and (B) obtained by the formula (2) was 0.026. As other elements (excluding oxygen) than the metallic elements having a valence of 4 or less, phosphorus (pentavalent, nonmetal element) was contained in an amount of 0.2% by weight as $P_2O_5$, and niobium (pentavalent) was contained in an amount of 0.2% by weight as $Nb_2O_5$, the $TiO_2$ purity was 98.4% by weight, and the specific surface area obtained by BET method was 6.7 $m^2/g$.

The content of tin oxide contained in the Sample F was 0.075 g as $SnO_2$ per 1 $m^2$ of the surface area of titanium dioxide, and the content of phosphorus with respect to tin oxide was a proportion of 0.17 in terms of the atomic ratio P/Sn. The Sample F contained zinc (divalent) in an amount of 0.025, sodium (monovalent) in an amount of 0.016, aluminum (trivalent) in an amount of 0.01 and silicon (tetravalent) in an amount of 0.017 in atomic ratio to Sn of tin oxide, and other metallic elements having a valence of 4 or less were not detected, and (A) obtained by the formula (1) was 0.108.

Test Example 1

Powder resistance (Ω·cm) of the electroconductive powders obtained in the above Examples 1-4 and Comparative Examples 1 and 2 was measured by the following method to obtain the results as shown in Table 1. From the results, it can be seen that the Samples A-D of the examples of the present invention had satisfactory powder resistance value.

(Evaluation of Powder Resistance)

One gram of the sample powder was compacted under a pressure of 9.8 MPa using a columnar cylinder (18 mm in inner diameter) to obtain a columnar powder compact. A DC resistance of the columnar powder compact was measured and a powder resistance was calculated by the following formula.

Powder resistance (Ω·cm)=measured value (Ω)×sectional area $(cm^2)$/thickness (cm)

TABLE 1

| | Titanium dioxide | | Electroconductive powder | | | |
|---|---|---|---|---|---|---|
| Sample | (B) of formula (2) | $TiO_2$ purity (%) | $SnO_2$ content*1 $(g/m^2)$ | P/Sn atomic ratio | (A) of formula (1) | Powder resistance (Ω·cm) |
| Sample A | 0.000 | 99.96 | 0.076 | 0.17 | 0.000 | 3.1 × 10² |
| Sample B | 0.005 | 99.7 | 0.074 | 0.17 | 0.019 | 1.0 × 10³ |
| Sample C | 0.015 | 99.0 | 0.070 | 0.17 | 0.057 | 3.5 × 10³ |
| Sample D | 0.000 | 99.9 | 0.077 | 0.17 | 0.000 | 8.3 × 10² |

TABLE 1-continued

| | Titanium dioxide | | Electroconductive powder | | | |
|---|---|---|---|---|---|---|
| Sample | (B) of formula (2) | $TiO_2$ purity (%) | $SnO_2$ content*1 $(g/m^2)$ | P/Sn atomic ratio | (A) of formula (1) | Powder resistance (Ω·cm) |
| Sample E | 0.034 | 97.6 | 0.040 | 0.17 | 0.120 | 2.0 × 10⁵ |
| Sample F | 0.026 | 98.4 | 0.075 | 0.17 | 0.108 | 1.2 × 10⁶ |

*1 $SnO_2$ content (g) per 1 $m^2$ of the surface area of titanium dioxide.

Test Example 2

20 g of each of the electroconductive powders of Examples 1-4 and Comparative Example 2 was mixed with 30.6 g of an acrylic resin (ACRYDIC A-165-45, solid content=45% by weight, manufactured by Dainippon Ink & Chemicals Inc.), 16.4 g of a toluene-butanol mixed solution (mixing weight ratio=1:1) and 50 g of glass beads, and the mixture was put in a paint shaker (#5110 manufactured by Red Devil Co.) and shaken for 20 minutes to prepare a mill base. Then, the above acrylic resin and toluene-butanol mixed solution were added to each mill base in such an amount as giving the pigment concentration as shown in Table 2, followed by mixing with stirring to prepare a paint. This paint was coated on an art paper so as to give a dry coat thickness of 22 μm, and the coated paper was subjected to air-drying for 24 hours to produce a test paper. The surface resistivity of the resulting sheet was measured by TR-8601 (chamber: TR-42 manufactured by Advantest Co.) or R-506 (chamber: P-611 manufactured by Kawaguchi Electric Mfg. Co. Ltd.) to obtain the results as shown in Table 2. It can be seen from the results that Samples A-D of the examples of the present invention gave satisfactory surface resistivity.

TABLE 2

| | | Surface resistivity (Ω/□) | | |
|---|---|---|---|---|
| Pigment concentration | | 30 wt % | 50 wt % | 60 wt % |
| Example 1 | Sample A | 3.0 × 10¹¹ | 1.2 × 10⁹ | 1.1 × 10⁸ |
| Example 2 | Sample B | 3.2 × 10¹² | 3.9 × 10⁹ | 1.2 × 10⁹ |
| Example 3 | Sample C | 4.5 × 10¹² | 1.2 × 10¹⁰ | 2.1 × 10⁹ |
| Example 4 | Sample D | 4.8 × 10⁷ | 5.1 × 10⁷ | 3.9 × 10⁷ |
| Comparative Example 2 | Sample F | 9.0 × 10¹² | 8.0 × 10¹¹ | 8.0 × 10¹¹ |

In order to know the influence of the content of tin oxide, Samples G, H and I were prepared in the same manner as in Example 1, except that the 50 wt % aqueous stannic chloride ($SnCl_4$) solution was used in an amount of 104 g, 260 g and 346 g in place of 173 g.

For adjusting the phosphorus content in these samples to 0.17 in atomic ratio P/Sn, the 85 wt % phosphoric acid ($H_3PO_4$) used in Example 1 was used in an amount of 3.7 g, 9.2 g and 12.2 g in place of 6.1 g.

The powder resistance of the resulting samples was measured in the same manner as in Test Example 1 to obtain the results as shown in Table 3. Furthermore, the surface resistivity of the samples was measured in the same manner as in Test Example 2 to obtain the results as shown in Table 4. It can be seen from these results that when the amount of tin oxide constituting the electroconductive layer is in the range of 0.03-0.3 g as $SnO_2$ per 1 $m^2$ of the surface area of titanium dioxide, satisfactory powder resistivity and surface resistivity can be obtained.

TABLE 3

|  | $SnO_2$ content*1 (g/m$^2$) | P/Sn atomic ratio | Powder resistance (Ω·cm) |
| --- | --- | --- | --- |
| Sample G | 0.045 | 0.17 | $2.7 \times 10^3$ |
| Sample A | 0.076 | 0.17 | $3.1 \times 10^2$ |
| Sample H | 0.113 | 0.17 | $1.4 \times 10^2$ |
| Sample I | 0.152 | 0.17 | $1.2 \times 10^2$ |

*1 $SnO_2$ content (g) per 1 m$^2$ of the surface area of titanium dioxide.

TABLE 4

|  | $SnO_2$ content*1 (g/m$^2$) | Surface resistivity (Ω/□) | | |
| --- | --- | --- | --- | --- |
|  |  | 30 wt % | 50 wt % | 60 wt % |
| Sample G | 0.045 | $1.9 \times 10^{12}$ | $1.3 \times 10^9$ | $9.0 \times 10^8$ |
| Sample A | 0.076 | $3.0 \times 10^{11}$ | $1.2 \times 10^9$ | $1.1 \times 10^8$ |

*1 $SnO_2$ content (g) per 1 m$^2$ of the surface area of titanium dioxide.

In order to know the influence of the content of phosphorus, Samples J and K were prepared in the same manner as in Example 1, except that phosphoric acid was not added or the 85 wt % phosphoric acid ($H_3PO_4$) was used in an amount of 10.2 g in place of 6.1 g.

The powder resistance of the resulting samples was measured in the same manner as in Test Example 1 to obtain the results as shown in Table 5. It can be seen from these results that when the amount of phosphorus contained in the electroconductive layer with respect to tin oxide is 0.10-0.50 in atomic ratio P/Sn, satisfactory powder resistivity can be obtained.

TABLE 5

|  | P/Sn atomic ratio | Powder resistance (Ω·cm) |
| --- | --- | --- |
| Sample J | 0.00 | $8.2 \times 10^6$ |
| Sample A | 0.17 | $3.1 \times 10^2$ |
| Sample K | 0.28 | $1.1 \times 10^3$ |

In order to know the influence of the firing temperature, Samples L, M, N, O, P, Q and R were prepared in the same manner as in Example 1, except that the firing at 850° C. was not carried out and carried out at 600° C., 700° C., 800° C., 900° C., 950° C. and 1000° C. in the air.

The powder resistance of the resulting samples was measured in the same manner as in Test Example 1 to obtain the results as shown in Table 6. It can be seen from the results that the firing temperature is preferably about 750-925° C.

TABLE 6

|  | Firing temperature (° C.) | Powder resistance (Ω·cm) |
| --- | --- | --- |
| Sample L | not firing | $3.5 \times 10^4$ |
| Sample M | 600 | $2.2 \times 10^4$ |
| Sample N | 700 | $2.5 \times 10^4$ |
| Sample O | 800 | $8.4 \times 10^2$ |
| Sample A | 850 | $3.1 \times 10^2$ |
| Sample P | 900 | $3.2 \times 10^3$ |
| Sample Q | 950 | $1.4 \times 10^6$ |
| Sample R | 1000 | $2.0 \times 10^6$ |

In order to know the influence of pH when adding tin chloride and phosphoric acid, Sample S was prepared in the same manner as in Example 1, except that an aqueous sodium hydroxide solution and a mixed solution comprising stannic chloride ($SnCl_4$), 85 wt % phosphoric acid ($H_3PO_4$) and 12N-hydrochloric acid solution were added in parallel to the aqueous suspension of high quality rutile type titanium dioxide over a period of 60 minutes with maintaining the pH of the suspension at 9-10, and then the final pH of the suspension was adjusted to 2.

The specific surface area of the Sample S was 17.3 m$^2$/g and the specific surface area of the electroconductive layer was 49.5 m$^2$/g, and thus it is seen that the electroconductive layer formed in the Sample S was more continuous than that in the Sample A in Example 1. Furthermore, a continuous electroconductive layer could also be recognized from a transmission type electron microscope photograph.

The content of tin oxide contained in the Sample S was 0.075 g as $SnO_2$ per 1 m$^2$ of the surface area of titanium dioxide, and the content of phosphorus with respect to tin oxide was a proportion of 0.17 in terms of the atomic ratio P/Sn, the metallic elements having a valence of 4 or less were less than the limit of detection, and (A) shown by the formula (1) was 0.

The powder resistance of the resulting sample was measured in the same manner as in Test Example 1 to obtain the results as shown in Table 7. It can be seen from the results that regarding pH when adding tin chloride and phosphoric acid, not only the acidic region of about 2-6, but also the alkaline region of about 8-12 are preferred.

TABLE 7

|  | pH at the time of addition | Powder resistance (Ω·cm) |
| --- | --- | --- |
| Sample A | 2~3 | $3.1 \times 10^2$ |
| Sample S | 9~10 | $2.7 \times 10^2$ |

In order to know the influences of oxygen concentration and cooling method in firing, a sample (Sample T) was prepared by firing in the air the coated titanium dioxide powder before firing and rapidly cooling the fired product (the fired product was immediately taken out and left to stand at room temperature) or by firing the powder in the air and slowly cooling the fired product (cooling to 300° C. over a period of 2 hours) in Example 1. Furthermore, Samples U and V were prepared by firing in the air the coated titanium dioxide powder before firing in the atmosphere having an oxygen concentration of 7-8 vol % (air diluted with nitrogen gas) or 0 vol % (nitrogen gas) at 850° C. for 1 hour and thereafter cooling the fired product by the above-mentioned rapid cooling method or slow cooling method in Example 1.

The powder resistance of the resulting samples was measured in the same manner as in Test Example 1 to obtain the results as shown in Table 8. It can be seen from the results that when the titanium dioxide powder is fired in an atmosphere of low oxygen concentration or an inert gas atmosphere and cooled as it is, the electroconductivity obtained is stable and not greatly different depending on rapid cooling method or slow cooling method, and the influence of cooling method is small, and on the other hand, when the powder is fired in the air and thereafter cooled as it is, the rapid cooling method is preferred.

TABLE 8

| | Oxygen concentration in firing (vol %) | Powder resistance in rapid cooling method ($\Omega \cdot cm$) | Powder resistance in slow cooling method ($\Omega \cdot cm$) |
| --- | --- | --- | --- |
| Sample T | 20 | $1.3 \times 10^2$ | $2.0 \times 10^4$ |
| Sample U | 7~8 | $1.3 \times 10^2$ | $8.4 \times 10^2$ |
| Sample V | 0 | $7.8 \times 10^1$ | $5.4 \times 10^1$ |

INDUSTRIAL APPLICABILITY

The present invention provides titanium dioxide which contains substantially no antimony having a problem of toxicity and has an electroconductive layer of tin oxide doped with phosphorus having satisfactory electroconductivity.

The invention claimed is:

1. A method for producing an electroconductive powder which comprises adding an aqueous acidic solution in which a tin compound and a phosphorus compound are dissolved and an aqueous alkaline solution to an aqueous suspension of titanium dioxide in which the content of a metallic element having a valence of 4 or less contained in the titanium dioxide as an impurity is 0.02 or less as (B) obtained by the following formula (2)

$$(B)=(M'_1)\times(4-n'_1)\times(M'_2)\times(4-n'_2)+(M'_3)\times(4-n'_3)+(M'_4)\times(4-n'_4)+\ldots+(M'_Y)\times(4-n'_Y) \quad \text{Formula (2):}$$

(in the above formula, $M'_1, M'_2, M'_3, M'_4, \ldots, M'_Y$ represent an atomic ratio of each metallic element having a valence of 4 or less, the atomic ratio being to Ti of titanium dioxide, $n'_1, n'_2, n'_3, n'_4, \ldots, n'_Y$ represent a valence number of each metallic element having the atomic ratio of $M'_1, M'_2, M'_3, M'_4, \ldots, M'_Y$, Y in $M'_Y$ and $n'_Y$ represents the number of the metallic element contained in the titanium dioxide and can have a natural number of 1 or more, with maintaining pH of the aqueous suspension in the range of 2-6 or 8-12, then fractionating the resulting product, and firing the product in an air or in an atmosphere of low oxygen concentration at a temperature of 600-925° C. to form an electroconductive layer containing tin oxide and phosphorus on the surface of the titanium dioxide.

2. A method according to claim 1, wherein the pH is 8-12.

3. A method according to claim 1, wherein the firing is carried out in the atmosphere of low oxygen concentration.

4. An electroconductive powder obtained by the method of claim 1 wherein the electroconductive powder obtained has an electroconductive layer containing tin oxide and phosphorus, but containing no antimony on the surface of titanium dioxide, and the content of a metallic element having a valence of 4 or less which is contained as an impurity in the electroconductive powder is 0.1 or less as (A) obtained by the following formula (1):

$$(A)=(M_1)\times(4-n_1)+(M_2)\times(4-n_2)+(M_3)\times(4-n_3)+(M_4)\times(4-n_4)+\ldots+(M_X)\times(4-n_X) \quad \text{Formula (1):}$$

(in the above formula, $M_1, M_2, M_3, M_4, \ldots, M_X$ represent an atomic ratio of each metallic element having a valence of 4 or less to Sn of the tin oxide in the electroconductive powder, $n_1, n_2, n_3, n_4, \ldots, n_X$ represent a valence number of each metallic element having the atomic ratio of $M_1, M_2, M_3, M_4, \ldots, M_X$, X in $M_X$ and $n_X$ represents the number of the metallic element contained in the electroconductive powder and can have a natural number of 1 or more.

5. An electroconductive powder obtained by the method of claim 1 wherein the pH of the aqueous suspension is maintained in the range of 8-12 and the electroconductive powder obtained has an electroconductive layer containing tin oxide and phosphorus, but containing no antimony on the surface of titanium dioxide, and the content of a metallic element having a valence of 4 or less which is contained as an impurity in the electroconductive powder is 0.1 or less as (A) obtained by the following formula (1):

$$(A)=(M_1)\times(4-n_1)+(M_2)\times(4-n_2)+(M_3)\times(4-n_3)+(M_4)\times(4-n_4)+\ldots+(M_X)\times(4-n_X) \quad \text{Formula (1):}$$

(in the above formula, $M_1, M_2, M_3, M_4, \ldots, M_X$ represent an atomic ratio of each metallic element having a valence of 4 or less to Sn of the tin oxide in the electroconductive powder, $n_1, n_2, n_3, n_4, \ldots, n_X$ represent a valence number of each metallic element having the atomic ratio of $M_1, M_2, M_3, M_4, \ldots, M_X$, X in $M_X$ and $n_X$ represents the number of the metallic element contained in the electroconductive powder and can have a natural number of 1 or more; and a specific surface area of the electroconductive layer is 70 $m^2/g$ or smaller.

6. An electroconductive powder obtained by the method of claim 4 or 5, wherein the amount of the tin oxide forming the electroconductive layer is in the range of 0.015-0.3 g as $SnO2$ per 1 $m^2$ of the surface area of titanium dioxide.

7. An electroconductive powder obtained by the method of claim 4 or 5, wherein the amount of the phosphorus contained in the electroconductive layer with respect to tin oxide is a proportion of 0.10-0.50 in terms of the atomic ratio P/Sn.

* * * * *